United States Patent Office 3,649,707
Patented Mar. 14, 1972

---

3,649,707
DUAL CATALYST IN STEAM DEALKYLATION PROCESS
George R. Lester, Park Ridge, Ill., assignor to Universal Oil Products Company, Des Plaines, Ill.
No Drawing. Filed June 27, 1969, Ser. No. 837,362
Int. Cl. C01b *1/18;* C07c *3/58;* C10g *31/14*
U.S. Cl. 260—672                                    11 Claims

ABSTRACT OF THE DISCLOSURE

Alkylaromatic hydrocarbons are dealkylated, in admixture with steam, in a dual reaction zone; the first containing a cobalt component, nickel component or a Group VI–B component as an active catalytic ingredient and the second containing a platinium, palladium, or rhodium component, as an active catalytic ingredient.

BACKGROUND OF INVENTION

This invention relates to a process for the dealkylation of alkylaromatic hydrocarbons, particularly alkylbenzenes. In particular, this invention relates to a steam dealkylation process utilizing dual reactions zones; the first reaction zone utilizing a catalytic composite containing as an active catalytic ingredient a cobalt component, a nickel component or a Group VI–B component and the second reaction zone utilizing a catalytic composite containing as an active catalytic ingredient a platinum, palladium, or rhodium component.

Processes for the dealkylation of alkyl-substituted aromatics have acquired significant importance within the petroleum and petrochemical industry. In particular, the demand for benzene, a basic building block in the field of organic chemistry, often exceeds its naturally occurring supply thus necessitating the dealkylating of the more readily available alkyl-substituted benzenes. For example, benzene is in demand as a starting material in the manufacture of styrene, phenol, alkylsulfonate detergents, nylon intermediates, etc. This demand is met in part by the dealkylation of alkylbenzenes, particularly toluene. Xylenes, etc., are also convertible to benzene but in recent years they have acquired a greater value than benzene itself and it is presently economically impractical to submit them to dealkylation.

In addition, there exists a demand for naphthalene as an intermediate in the production of phthalic anhydride. Since naphthalene exists in rather small amounts in petroleum, it is desirable to dealkylate the more prevalent and available alkylnaphthalenes to form naphthalene.

Several processes are available, both catalytic and non-catalytic, for the dealkylation of alkylaromatic hrydrocarbons. These processes generally use hydrogen or steam as a source of hydrogen for the reaction involved, namely, the cleavage of an alkyl group from the aromatic nucleus. Steam is particularly preferred because it is readily available and yields, on reaction, readily recoverable and valuable hydrogen. In general, catalytic reactions are preferred since the presence of the catalyst requires less severe reaction conditions . . . i.e. lower reaction temperatures and lower reaction times . . . than otherwise available in the absence of catalysts. However, as is characteristic in most catalytic reactions, the catalysts have a tendency to undergo deactivation during the course of processing rendering them less effective than originally and requiring more severe reaction conditions to maintain a constant conversion. Eventually, the activity of the catalyst declines to such a level that processing must be temporarily interrupted to either regenerate or replace the catalyst.

A particular catalytic composite for dealkylating alkylaromatic hydrocarbons in the presence of steam comprises as an active catalytic ingredient a Group VIII noble metal component, particularly platinum, palladium, or rhodium. This type of catalyst shows remarkable initial activity and selectivity—i.e. equivalent conversions at reaction conditions significantly lower than those conditions required for a non-catalytic reaction—but, unfortunately, this catalyst undergoes deactivation at a rate which makes its effective use as a commercial catalytic composite for steam dealkylation marginal. This deactivation appears to be caused, at least in part, by the deposition of polynuclear condensed ring compounds on the surface of the catalyst which ultimately form what is known in the art as "coke," thus rendering the catalytic surface relatively inaccesible for further reaction.

SUMMARY OF THE INVENTION

Accordingly, it is an object of this invention to provide a process for the steam dealkylation of alkyl-aromatic hydrocarbons utilizing a catalytic composite containing as an active catalytic ingredient platinum, palladium, or rhodium wherein this composite undergoes deactivation at a relatively negligible, tolerable rate. In particular, it is an object of this invention to provide a steam dealkylation process wherein a catalytic composite containing platinum, palladium, or rhodium can be effectively and economically utilized.

Dealkylation catalysts containing a Group VI–B component, a cobalt component and/or a nickel component are well known to the art. These catalysts are relatively resistant to deactivation but are considerably less selective than a catalyst containing a platinum, palladium, or rhodium component. Iron is not preferred as the sole active catalytic ingredient because it evidences considerably less activity than the other components. However, by utilizing both these catalysts in combination in a dealkylation process, namely, first dealkylating a small portion of the alkylaromatic in a reaction zone utilizing a catalytic composite containing a Group VI–B, cobalt, and/or nickel component before dealkylating the majority of the alkylaromatic in a reaction zone utilizing a catalytic composite containing a platinum, palladium, or rhodium component, the latter composite can be effectively utilized without undergoing excessive deactivation.

Therefore, in an embodiment, this invention provides a process for the dealkylation of an alkylaromatic hydrocarbon which comprises contacting, in a first reaction zone, said hydrocarbon in admixture with steam, at a steam to hydrocarbon mole ratio of about 1:1 to about 30:1, with a dealkylation catalytic composite comprising as an active catalytic ingredient a cobalt component, a nickel component, or a Group VI–B component at dealkylation conditions correlated to produce a first reaction zone effluent wherein about 1 to about 20 wt. percent of the alkylaromatic passed to said zone is dealkylated, and passing said first reaction zone effluent to a second reaction zone and contacting said effluent, in said second reaction zone, at dealkylation conditions with a catalytic composite comprising as an active catalytic ingredient a platinum, palladium, or rhodium component.

In more limited embodiments, the process of this invention utilizes dealkylation conditions including a temperature of about 300° C. to about 700° C., and a pressure of about atmospheric to about 100 atmospheres. The catalytic composites to be contained in said first reaction zone include alumina having combined therewith chromia and/or nickel in an active form. The second reaction zone catalytic composite comprises alumina having about 0.05 to about 5 wt. percent platinum, palladium, or rhodium composited therewith. In further particularly limited embodiments, said second reaction zone catalytic composite also contains chromia, alkali metal oxides, and/or iron oxide.

In a specific embodiment, the aforementioned process uses a second recation zone catalytic composite comprising alumina having from about 0.1 to about 4 wt. percent alkali metal, from about 0.2 to about 20 wt. percent ferric oxide, from about 0.05 to about 5.0 wt. percent platinum, palladium, or rhodium, and from about 1.0 to about 60 wt. percent chromia composited therewith.

Other objects and embodiments referring to applicable alkylaromatic hydrocarbons, alternative catalytic composites and more definitive reaction conditions will be found in the following more detailed description of this process.

DESCRIPTION OF PREFERRED EMBODIMENTS

The process of this invention is adapted to the dealkylation of alkylaromatic hydrocarbons, particularly the alkylbenzenes such as toluene, the xylenes, the trimethylbenzenes, ethylbenzene, n-propylbenzene, cumene, t-butylbenzene, n-butylbenzene, etc. Toluene is particularly preferred. It is also within the scope of this invention to dealkylate the lower molecular weight polycyclic alkylaromatics such as the methylnaphthalenes, ethylnaphthalenes, methylanthracenes, ethylanthracenes, etc., including those aromatics having larger and/or a greater number of alkyl groups than those here enumerated. It is to be further understood that by varying reaction conditions within the limitations hereinafter set forth, the various alkylaromatic hydrocarbons may be partially or completely dealkylated. For example, mesitylene can be converted to meta-xylene, toluene, or benzene, whereas p-tert-butyltoluene can be converted to p-propyltoluene, p-ethyltoluene, and p-xylene. It is also within the scope of this invention to dealkylate any mixture of alkylaromatic hydrocarbons as well as single species and the alkylaromatic may be present in admixture with other hydrocarbons or inerts typically found in refinery streams. It is to be understood that the aforementioned compounds are only representative of the class of alkylaromatic hydrocarbons which may be used in the process of this invention and do not represent compounds which this process may be limited to.

The essence of this invention involves dealkylating an alkylaromatic hydrocarbon in a first reaction zone at dealkylation conditions correlated to produce a first reaction zone effluent wherein about 1 to about 20 wt. percent, preferably about 1 to 10 wt. percent, of the alkylaromatic passed to said zone is dealkylated. This reaction zone utilizes a catalytic composite containing as an active catalytic ingredient a cobalt component, a nickel component, or a Group VI-B component. As used herein, a first reaction zone effluent wherein about 1 to about 20 wt. percent of the alkylaromatic passed to said zone is dealkylated refers to the wt. percent conversion attained in that zone. Thus, if 10 wt. percent of the original alkylaromatic has an alkyl group removed, this corresponds to a 10 wt. percent conversion.

By first dealkylating a portion of the alkylaromatic hydrocarbon in the first reaction zone, the catalyst in the second reaction zone is able to perform in a very stable manner undergoing little loss, if any, in activity. This effect appears to be the result of the deposition, in the first reaction zone, of condensed, hydrogen-deficient, high molecular weight components present in the alkylaromatic, either originally or more particularly, as formed during the initial heating of the alkylaromatic to dealkylation conditions.

This stabilizing effect observed in the second reaction zone is obtained when the first reaction zone catalytic composite contains as the active catalytic ingredient a Group VI-B, a cobalt and/or a nickel component, namely a chromium, molybdenum, tungsten, cobalt, or nickel component. Iron may also be utilized but not as the sole active catalytic ingredient since as hereinbefore stated, it is considerably less active than the other enumerated species. This component can exist as the elemental metal or as a compound thereof, and preferably as an oxide thereof. Other Group VIII metal components are undesirable as a first reaction zone component because they undergo excessive deactivation. These first reaction zone catalysts are well known to the art and a detailed discussion as to their method of preparation etc. is not necessary.

These catalytic components to be utilized in the first reaction zone are preferably composited with a high surface area refractory inorganic oxide type carirer characterized in having a surface aea of at least 50 meter$^2$/gram. These carriers include alumina, silica, silica-alumina, zirconia, thoria, magnesia, titania, bauxite, mordenite, faujasite, etc.

Particularly preferred active catalytic components include chromia ($Cr_2O_3$), molybdic trioxide ($MoO_3$), or nickel oxide (NiO) either utilized alone or as an active catalytic ingredient when associated with the foregoing carrier materials. For example, chromia itself is an effective catalyst or it may be utilized in admixture with alumina, etc. If these preferred active components are composited with the various supports such as alumina, it is preferred that they comprise about 1 to about 60 wt. percent of the total composite. It is also within the scope of this invention to include a mixture of two or more of the active Group VI-B, cobalt and nickel components. For example, a particularly preferred first reaction zone catalytic composite comprise a combination of nickel and chromia, particularly a chromia composite containing about 1 to about 50 wt. percent nickel. In addition nickel-alumina composites or nickel-silica composites containing about 1 to about 50 wt. percent nickel are preferred. These nickel-chromia, nickel-alumina and nickel-silica catalyst are more fully described in Neftekhimiya, 426–430 (1964). If $Fe_2O_3$ is utilized as an additional component, concentrations of about 0.2 to about 20 wt. percent are preferred.

These catalytic composites can be prepared by any method well known to the art, the exact method not being critical to the invention. These methods include impregnation, co-precipitation, co-pilling, sublimation, etc. It may also be desirable to include, during the manufacture of the above catalysts, compounds which inhibit some of the cracking capabilities of the catalyst to avoid aromatic ring loss. These compounds, to be used in minor amounts . . . i.e. less than 5 wt. percent include the hydroxides and alkaline salts of the alkaline earth metals or alkali metals.

The dealkylation conditions to be utilized in the first reaction zone include a temperature of about 300° C. to about 700° C., a pressure of about atmospheric to about 100 atmospheres, a steam to hydrocarbon mole ratio of about 1:1 to about 30:1 or more, and a liquid hourly hydrocarbon space velocity of about 0.1 to about 20 hr.$^{-1}$ or more. As used herein, space velocity refers to the volume of hydrocarbon passed per hour per volume of catalyst. The conversion level of about 1 to about 20 wt. percent in this first reaction zone is attained by correlating the reaction temperature and space velocity in a manner readily understood by those trained in the art, namely, using low temperatures with low space velocities and high temperatures with high space velocities, all within the foregoing defined limits.

It is to be noted that these first reaction zone catalysts are in themselves known dealkylation catalysts capable of higher conversions than those conversions which the first reaction zone is limited to in this invention. However, these catalysts do not have the selectivity which the second reaction zone catalysts have, but these first zone catalysts have some of the stability which the second zone catalysts lack. Thus, by using these catalysts in the manner previously indicated, a stable second zone is obtained utilizing the benefit of its increased activity and selectivity.

The catalytic composites to be utilized in the second reaction zone contain a Group VIII noble metal component, preferably rhodium, platinum, or palladium associated with a high surface area refractory inorganic oxide support such as those supports previously described in relation to the first reaction zone catalytic composite. The other Group VIII noble metals are not preferred since they display little, if any, catalytic selectivity in comparison to platinum, palladium, and rhodium. Particularly preferred is rhodium. Particularly preferred supports are steamed alumina, alpha-alumina and alpha-alumina-chromia and/or ferric oxide supports. The platinum, palladium, or rhodium component is present in an amount from about 0.05 to about 5 wt. percent of the composite as calculated on an elemental basis. In fact, any of the previously described first reaction zone catalytic composites when combined with a rhodium, platinum, or palladium component could serve as an effective second zone catalyst with increased activity and selectivity over that obtainable in the absence of such component. However, these catalysts will not have the desired stability characteristics if utilized in a single reaction zone. The platinum, palladium, or rhodium component can be combined with these supports by those techniques well known to the art including impregnation, co-precipitation, co-pilling, etc. Preferred are impregnation techniques utilizing water-soluble platinum, palladium, or rhodium salts such as the chlorides, nitrates, etc. In addition, as in the case of the first reaction zone components, a basic alkaline earth or alkali metal component may be present.

A particularly preferred catalytic composite comprises alumina having combined therewith about 0.1 to about 4 wt. percent alkali metal, preferably potassium, from about 0.2 to about 20 wt. percent $Fe_2O_3$, from about 0.05 to about 5.0 wt. percent platinum, palladium, or rhodium, and from about 1.0 to about 60 wt. percent chromia. Another preferred catalytic composite comprises alumina having combined therewith from about 0.1 to about 4 wt. percent alkali metal, particularly potassium, from about 0.05 to about 5.0 wt. percent platinum, palladium, or rhodium, and from about 1.0 to about 60 wt. percent chromia. These catalysts and methods for their preparation are specifically taught in my U.S. Pats. Nos. 3,436,433 and 3,436,434, the teachings of which are specifically incorporated by reference herein.

The dealkylation conditions to be utilized in the second reaction zone include a temperature of about 300° C. to about 700° C., a pressure of about atmospheric to about 100 atmospheres or more, a steam to hydrocarbon mole ratio of about 1:1 to about 30:1 or more, and a liquid hourly space velocity of about 0.1 to about 20 hr.$^{-1}$ or more, preferably from about 0.5 to about 5 hr.$^{-1}$.

The process of this invention may be effected in either a batch or a continuous type operation by procedures well known to those skilled in the art. The preferred method of operation is to operate both zones in a continuous manner using a fixed-bed catalytic reactor in each zone. In this method of operation, water is preferably converted to steam and the steam commingled with the alkylaromatic charge stock in the aforementioned proportions. The resultant mixture is then preheated to the desired first reaction zone temperature and passed to this reaction zone. The effluent from this reaction zone is then passed to the second reaction zone, preferably at the same temperature as the first reaction zone. Accordingly, if the first reaction zone effluent is at a higher temperature than desired, suitable intercooling means must be utilized to cool the first reaction zone effluent to the second reaction zone temperature. Thus, it is usually preferred to operate both reaction zones at the relatively same temperature and controlling the first reaction zone conversion through manipulation of space velocity. However, it is within the scope of this invention to oeprate the first reaction zone with temperatures either above or below that temperature desired in the second reaction zone with the second reaction zone temperature being controlled by appropriate heat exchange means between each reaction zone. In addition, steam can be added at any point within or between the two reaction zones as a means of temperature control. The products from the second dealkylation zone are conveniently recovered by passing the effluent to a condenser-separator system whereby the normally liquid components are condensed to form an upper hydrocarbon layer and a lower aqueous layer with the non-condensable products such as hydrogen, carbon monoxide, carbon dioxide, methane, ethane, etc., discharged overhead. The hydrocarbon layer is continuously separated, dried, and fractionated to recover the desired product and unconverted feed for recycle to the first reaction zone.

It is preferred that the first reaction zone be separate from the second reaction zone to allow operating flexibility within the process. However, it is within the scope of this invention to contain both reaction zones within the same reactor. A partcularly preferred method of operation is to provide, as a first reaction zone, two or more reactors in parallel, one reactor on stream at a given time and the other reactor undergoing regeneration. By utilizing this mode of operation, processing in the second reaction zone may continue uninterrupted while the first reaction zone catalytic composite is being regenerated or replaced. It is to be noted that while the first reaction zone catalytic composites are more stable than the second zone composites when utilized without the benefit of the hereindescribed first reaction zone, these first reaction zone catalysts do undergo deactivation. However, these catalysts are more readily regenerable or economically replacable than the second reaction zone composites and, thus, when used in combination with the second reaction zone result in an improved overall process than otherwise attainable by using either catalyst alone.

EXAMPLES

The following examples are given to illustrate the process of this invention and the benefits to be afforded through its use. However, these examples are not necessarily presented for purposes of limiting the scope of this invention but in order to further illustrate the embodiments of the present process.

EXAMPLE I

A catalytic composite containing about 30% chromia, the remainder, alumina, is prepared by dissolving about 1000 grams of aluminum chloride hexahydrate in 10 liters of water and adjusting the pH to 9.0–8.5 by addition of 70 cc. of concentrated ammonium hydroxide. A precipitate is recovered by filtration and washed three times with 10 liters of a 1 weight percent ammonia solution. The washed material is then slurried with a common solution of 383 grams of chromium trioxide. This slurry is then evaporated to dryness, further dried at 250° C. and calcined at 650° C. In a like manner a catalyst composite containing about 20% nickel oxide, the remainder alumina is prepared by slurrying 190 grams of nickel oxide with the alumina precipitate formed as above. A catalytic composite is also prepared in the same manner as above except that in utilizing cobalt oxide and molybdenum trioxide instead of chromia a final catalytic composite containing 5% cobalt oxide, 10% molybdenum trioxide,, the remainder, alumina, is formed.

EXAMPLE II

A catalytic composite is prepared by impregnating a calcined alumnia base with lithium nitrate to provide a lithium content of about 0.5% on the combined catalyst. This base is calcined at a temperature of 1000° F. for a period of two hours. The calcined base is then impregnated with platinum chloride in a hydrochloric acid solution in an amount so as to give a final catalyst composition containing 0.75% by wt. platinum. This composition is dried, calcined in an atmosphere of air containing 25% by volume steam for a period of 5 hours at 950° F. and thereafter ground to 20 to 40 mesh. In like manner, a second catalytic composite is prepared, differing only in that the platinum is replaced by 1.0 wt. percent rhodium as an active catalytic ingredient. A third catalytic composite containing about 1.0% rhodium, 10% chromia, 2% potassium oxide, and 1.0% iron ferric oxide on an alumina support is prepared by treating: a previously calcined alumina with a mixture of 40 mole percent water and 60 mole percent air at a temperature of 600° C. for a period of 12 hours. 75 grams of this stream-treated alumina is then slurried in an aqueous solution containing 12 grams of chromia and 5 grams of $Fe(NO_3)_3 \cdot 9H_2O$. This slurry is evaporated to dryness, further dried at 250° C., and then calcined at 650° C. An aqueous solution of potassium nitrate and rhodium trichloride is then utilized to impregnate the calcined particles to give the desired potassium and rhodium content. These partcles are then dried and further calcined at 550° C. for two hours.

A fourth catalytic composite containing 0.4% rhodium, 40% chromia, 2% potassium oxide, the remainder alumina is prepared by dissolving aluminum chloride hexahydrate in water and adjusting the pH to 9.0–8.5 by the addition of concentrated ammonium hydroxide. A precipitate is recovered by filtration and washed 3 times with a 1 wt. percent ammonia solution. This washed material is then slurried with a common solution of chromium trioxide and potassium nitrate in water. The resultant slurry is evaporated to dryness, further dried at 250° C. and calcined at 650° C. Particles in the 20–40 mesh range are separated and impregnated with an aqueous solution of rhodium chloride in an amount sufficient to give the foregoing rhodium composition. The resultant composite is then dried and calcined at 550° C. for 4 hours.

EXAMPLE III

About 100 grams of the lithiated-platinum-alumina composite from Example II is placed in a fixed-bed vertical tubular reactor of conventional design. Steam and toluene at a 20:1 mole ratio are passed, at a toluene liquid hourly space velocity of 0.5 to this reactor which is maintained at a pressure of 125 p.s.i.g. and a temperature of about 530° C. An initial conversion of toluene to benzene of about 75 wt. percent is observed. This conversion, while maintaining the reactor at the foregoing conditions, is observed to undergo a decline of about 1.6 wt. percent per day.

EXAMPLE IV

About 10 grams of the nickel-alumina composite of Example I is placed in a reactor similar to that utilized in Example III. Steam and toluene at a 20:1 mole ratio are passed to this reactor at a 10.0 toluene liquid hourly space velocity while maintaining the reactor at a temperature of 530° C. and a pressure of 125 p.s.i.g. A sample of this reactor's effluent shows a conversion of about 5 wt. percent. This effluent is then passed to a second reactor containing 100 grams of a lithiated-platinum-alumina composite as utilized in Example III and prepared in Example I under the same reaction conditions as utilized in Example III. An initial conversion of 75 wt. percent over this reactor is observed or, in other words, an 80% conversion over both reactors. This 75 wt. percent conversion over the second reactor declines at a rate of about 0.3 wt. percent per day thus, evidencing the stability afforded by first dealkylating a portion of the toluene in the first reactor. Similar results are obtained in using the chromia-alumina and the cobalt oxide-molybdenum oxide-alumina catalytic composites prepared in Example I.

EXAMPLE V

About 100 grams of the lithiated-rhodium-alumina composite of Example II is placed in a reactor of the same design as used in Example III. Steam and toluene at a 20:1 mole ratio are passed at a toluene liquid hourly space velocity of 0.5 to this reactor which is maintained at a pressure of 125 p.s.i.g. and a temperature of about 450° C. An initial conversion of toluene to benzene of about 75 wt. percent is observed, thus, indicting rhodium to be a more active dealkylation component than platinum. This conversion, while maintaining the reactor at the foregoing conditions, is observed to undergo a decline in conversion of about 1.0 wt. percent per day indicating a slightly more stable catalyst than the platinum catalyst of Example III. This decline, however, is greater than that attained in Example IV when utilizing platinum in a dual reactor system.

EXAMPLE VI

About 10 grams of the chromia-alumina composite of Example I is placed in a reactor similar to that utilized in Example IV. Steam and toluene at a 20:1 mole ratio are passed to this reactor at a 10.0 toluene liquid hourly space velocity while maintaining the reactor at a temperature of 450° C. and a pressure of about 125 p.s.i.g. A sample of this reactor's effluent shows a conversion of about 5 wt. percent. This effluent is then passed to a second reactor containing 100 grams of a lithiated-rhodium-alumina composite as utilized in Example V under the same reaction conditions as utilized in Example V. An initial conversion of 75 wt. percent over this second reactor is observed or, in other words, a 80% conversion over both reactors. This 75 wt. percent conversion over the second reactor declines at a rate of about 0.1 wt. percent per day, thus, evidencing the stability afforded by first dealkylating a portion of the toluene in the first reactor. Similar results are obtained when using the nickel oxide-alumina and a cobalt oxide-molybdenum oxide-alumina catalytic composites prepared in Example I.

EXAMPLE VII

Each of the catalytic composites designated as the third and fourth catalytic composites in Example II is placed in separate dealkylation reactors. The reactor containing the third catalytic composite, i.e. 1.0% rhodium, 10% chromia, 2% potassium oxide, 1.0% ferric oxide, and the remainder alumina, is maintained at a temperature of 430° C. and a pressure of 125 p.s.i.g. as steam and toluene in a 20:1 mole ratio are passed to the reactor at a 1.0 toluene liquid hourly space velocity. An initial conversion of 75 wt. percent declining at .8 wt. percent per day is observed. The reactor containing the fourth catalytic composite, i.e. 0.4% rhodium, 40% chromia, 2% potassium oxide, the remainder alumina, is maintained at a temperature of 430° C. and a pressure of 125 p.s.i.g. as steam and toluene in a 20:1 mole ratio are passed to the reactor at 1.2 toluene liquid hourly space velocity. An initial conversion of 75 wt. percent declining at .7 wt. percent per day is observed.

EXAMPLE VIII

The nickel-alumina composite of Example I is placed in a reactor maintained at 430° C. and 125 p.s.i.g. as toluene and steam in a 20:1 mole ratio and a 10.0 toluene liquid hourly space velocity are passed to the reactor. A sample of this effluent indicates a conversion of 7 wt. percent. A portion of this effluent is passed to reactors containing the identical catalysts and under the identical conditions as utilized in Example VII. An initial conversion of 75 wt. percent across the reactor containing the rhodium, chromia, potassium oxide, ferric oxide, alumina composite, declines at a rate of 0.1 wt. percent per day. The same initial conversion of 75 wt. percent obtained when utilizing the rhodium, chromia, potassium oxide, alumina composite declines at a rate of 0.1 rate wt. percent per day. This further evidences the benfit to be obtained by first dealkylating a small portion of the alkylaromatic hydrocarbon in a first reactor before passing the alkylaromatic to a second reactor containing a platinum, palladium or rhodium component.

From the foregoing examples, the beneficial import of this invention is readily ascertainable to those trained in the art. By dealkylation of a small portion of the alkyl-aromatic in a first reaction zone containing an active inexpensive, readily available catalyst, a second reaction zone utilizing a more selective catalyst may be utilized under stable conditions. Thus, by utilizing the embodiments of this invention, a catalytic composite containing a platinum, palladium or rhodium component as an active catalytic ingredient can be most effectively utilized in a dealkylation process.

I claim as my invention:

1. A process for the dealylation of an alkylaromatic hydrocarbon which comprises contacting, in a first reaction zone, a feed consisting essentially of said hydrocarbon and steam, at a steam to hydrocarbon mole ratio of about 1:1 to about 30:1, with a first dealkylation catalytic composite comprising as an active catalytic ingredient a cobalt component, a nickel component, or a Group VI–B component at dealkylation conditions correlated to produce a first reaction zone effluent wherein about 1 to about 20 wt. percent of the alkylaromatic hydrocarbon passed to said zone is dealkylated and passing said first reaction zone effluent to a second reaction zone and contacting said effluent, in said reaction zone, at dealkylation conditions, with a second catalytic composite of different composition than said first composite and comprising as an active catalytic ingredient a platinum, palladium, or rhodium component.

2. The process of claim 1 further characterized in that said dealkylation conditions include a temperature of about 300° C. to about 700° C. and a pressure of about atmospheric to about 100 atmospheres.

3. The process of claim 1 further characterized in that said first catalytic composite comprises alumina having combined therewith about 0.1 to about 50 wt. percent nickel, calculated on an elemental basis.

4. The process of claim 1 further characterized in that said first catalytic composite comprises alumina having combined therewith about 1.0 to about 60 wt. percent chromia.

5. The process of claim 1 further characterized in that said first catalytic composite comprises chromia having combined therewith about 0.1 to about 50 wt. percent nickel, calculated on an elemental basis.

6. The process of claim 1 further characterized in that said second catalytic composite comprises alumina having about 0.05 to about 5 wt. percent platinum, palladium, or rhodium composited therewith.

7. The process of claim 6 wherein said second catalytic composite has combined therewith about 1.0 to about 60 wt. percent chromia.

8. The process of claim 6 wherein said second catalytic composite has combined therewith about 1.0 to about 60 wt. percent chromia and about 0.2 to about 20 wt. percent $Fe_2O_3$.

9. The process of claim 6 wherein said catalytic composite comprises alumina having from about 0.1 to about 4 wt. percent alkali metal, from about 0.2 to about 20 wt. percent $Fe_2O_3$, from about 0.05 to about 5.0 wt. percent platinum, palladium, or rhodium and from about 1.0 to about 60 wt. percent chromia composited therewith.

10. The process of claim 9 further characterized in that said alkali metal is potassium.

11. The process of claim 1 further characterized in that said alkylaromatic is toluene.

References Cited

UNITED STATES PATENTS

| 2,436,923 | 3/1948 | Haensel | 260—666 |
| 2,734,929 | 2/1956 | Doumani | 260—672 |
| 3,108,063 | 10/1963 | Chin et al. | 260—354 |
| 3,198,846 | 8/1965 | Kelso | 260—672 |
| 3,222,132 | 12/1965 | Dowden | 23—212 |
| 3,291,850 | 12/1966 | Carson | 260—672 |
| 3,436,433 | 4/1969 | Lester | 260—672 |
| 3,436,434 | 4/1969 | Lester | 260—672 |
| 3,530,194 | 9/1970 | Quik et al. | 260—672 |

DELBERT E. GANTZ, Primary Examiner

G. E. SCHMITKONS, Assistant Examiner

U.S. Cl. X.R.

23—212 A; 208—49, 74; 252—465